Feb. 26, 1957 — O. E. CROWN ET AL — 2,782,600
HYDRAULIC BRAKE SAFETY DEVICE
Filed May 21, 1953
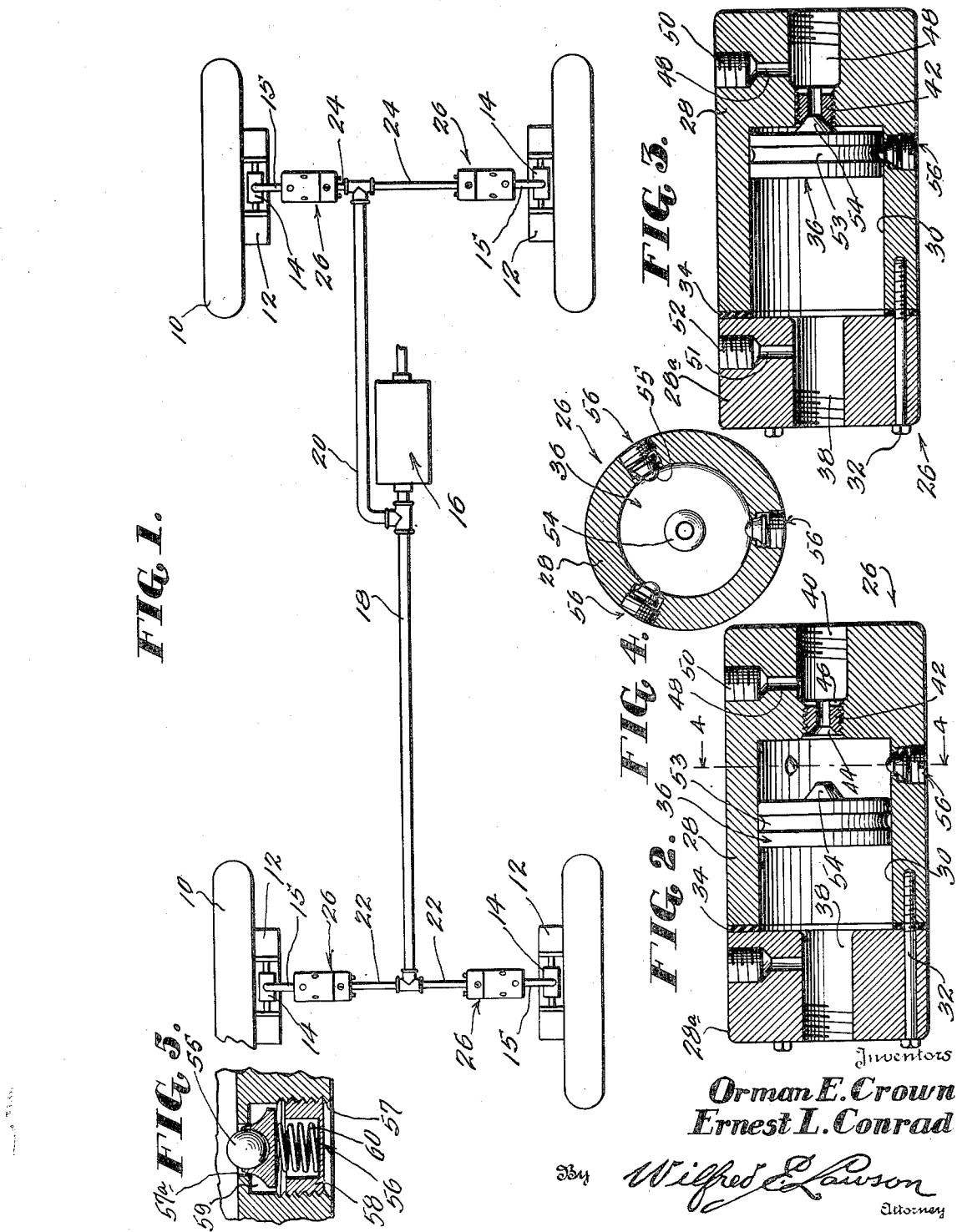
Inventors
Orman E. Crown
Ernest L. Conrad
By Wilfred E. Lawson
Attorney

United States Patent Office 2,782,600
Patented Feb. 26, 1957

2,782,600

HYDRAULIC BRAKE SAFETY DEVICE

Orman E. Crown and Ernest L. Conrad,
Los Angeles, Calif.

Application May 21, 1953, Serial No. 356,496

1 Claim. (Cl. 60—54.5)

This invention relates generally to motor vehicle brake systems and is directed particularly to improvements in safety devices for hydraulic brake systems.

A principal object of the present invention is to provide an improved hydraulic brake system for motor vehicles wherein the failure of the fluid line to one wheel cylinder will not result in the failure of all of the other cylinders connected with the remaining brakes so that even though one brake cylinder should fail or the line leading directly thereto should leak, the remaining brake cylinders can be operated to effect the application of the remaining brakes.

Another and more specific object of the invention is to provide in a hydarulic brake system, a safety shut off device adjacent to each wheel cylinder, through which the fluid is normally caused to pulsate in the normal operation of the master cylinder piston, but which will shut off the fluid flow to the adjacent wheel cylinder in the event of leakage therein or in the line leading thereto, the shutting off of the safety device being by automatic lock which prevents loss of the hydraulic fluid.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawings:

Figure 1 is a diagrammatic view in plan of a four wheel fluid brake system of a motor vehicle illustrating the positions therein of safety devices constructed in accordance with the present invention.

Figure 2 is a view in longitudinal section through one of the safety devices showing the position assumed by the locking piston with the brake parts at rest.

Figure 3 is a longitudinal section corresponding to Figure 2 and showing the position assumed by the locking piston when it is permitted its fullest extent of movement resulting from the failure of the flexible conduit between the safety device and the brake operating unit.

Figure 4 is a transverse section taken substantially on the line 4—4 of Figure 2.

Figure 5 is a sectional view on an enlarged scale showing the details of one of the piston locking units.

Referring now more particularly to the drawing Figure 1 illustrates diagrammatically the fluid brake system of a motor vehicle wherein the four wheels, each designated 10, are equipped with the usual brake units 12. Each of these brake units includes the conventional brake cylinder 14, which, when the brake fluid therein is subjected to pressure, functions to operate the brake bands in the conventional manner.

The numeral 16 designates the master cylinder from which leads the fluid lines 18 and 20, each of which lines connects with two lateral lines 22 and 24 respectively, each of which, in turn, is connected to a wheel cylinder 14 by a flexible conduit 15.

In accordance with the present invention, each of the lateral lines 22 and 24 leading from a main line to a brake cylinder, has interposed therein a safety device which is generally designated 26.

Each of the safety devices protects a wheel cylinder and comprises an elongate cylindrical body 28 in which is formed the piston chamber or cylinder 30. The body is here illustrated as having a removable end portion 28a which is secured in place by bolts 32 and between which end portion or head 28a and the main part of the body is a gasket 34.

As shown the portion 28a closes one end of the cylinder and thus provides means for the placement within the cylinder of the piston 36 which is hereinafter described in detail.

Formed through the end portion 28a is the threaded inlet passage 38 and at the opposite end of the body there is formed the threaded outlet or discharge passage 40.

The outlet passage 40 is connected with an end of the flexible conduit 15 which leads to the brake operating cylinder 14 while the passage 38 is connected with a lateral line 22 or 24 which leads from the master cylinder.

The inner end of the outlet passage 40 is slightly reduced in diameter as shown and has threaded therein the tubular valve seat member 42, the inner end of which is tapered or conical as indicated at 43 to form a seat for the hereinafter described portion of the piston 36.

The end of the valve seat member opposite from the seat 44 is provided with a transverse slot 46 for the engagement with the member of an end of a screw driver or other suitable implement whereby the member may be turned and adjusted with respect to the piston.

At the brake cylinder end of the unit there is formed the laterally directed filler hole 48 which is closed by the plug 50 and at the opposite or feed line end of the unit there is formed the laterally opening bleeder hole 51 which is closed at its outer end by the plug 52. The filler hole opens into the outlet passage 40 as shown, while the bleeder hole 51 opens into the inlet passage.

The piston 36 comprises a solid disk-member as illustrated having a diameter to adapt it to fit snugly in the cylinder 30 and formed around the periphery of the piston is a shallow channel 53.

At the center of the piston on the forward or advancing face thereof there is formed the conical valve plug 54 which is designed to enter and engage upon the seat 44 of the valve member when the piston is permitted to advance to its fullest forward position upon the development of a leak in the adjacent flexible conduit 15 or the adjacent brake cylinder 14.

When the piston 36 advances to its fullest extent in the cylinder 30 under the conditions above stated, it locks in such advanced position by the engagement in the circumferential channel 53 of locking balls 55, each of which forms a part of a locking unit which is generally designated 56. These locking units, preferably three in number as shown in Figure 4, are disposed in threaded sockets 57 formed in a circle around and in the wall of the body 28 adjacent to the end of the cylinder 30 nearest to the valve seat member 42.

As illustrated in Figure 5, each of the locking units comprises a threaded plug 58 which is engaged in the socket 57 and at the inner end of the plug is a carrier member 59 for the ball 55. Between the member 59 and the nut 58 is a coil spring which normally urges the ball carrying member 59 inwardly and the inner end of the socket 57 is reduced in diameter as indicated at 57a, where it opens into the cylinder so that only a portion of the ball 55 can project into the cylinder beyond the wall thereof.

As is clearly shown in Figures 2 and 3, the series of locking balls is placed at the proper location adjacent to the valve seat member 42 to permit the balls to engage in the annular channel 53 of the piston 36 when the conical valve plug 54 engages against the seat 44. By reason of the adjustable feature of the valve seat member 42 the seat can be located accurately to effect this locking of the piston as soon as the valve plug is firmly seated on the seat 44.

In the installation of the device standard hydraulic fittings are employed and when the device is installed the system is filled with hydraulic fluid through the filler hole 48. The system is bled free of air by the use of the bleeder hole 51, which, as previously stated, is located on the master cylinder side of the safety device.

In normal operation the floating piston 36 travels freely back and forth within the safety device cylinder, the volume of its displacement being equal to the volume displacement of the wheel cylinder plus about 5%, so that the safety device valve will not close during normal operation of the brakes.

Should there be a flexible hose failure between the safety device and the adjacent wheel cylinder the floating piston 36 will move forward and the conical valve plug 54 will engage the seat 44 and thus prohibit further loss of fluid through the broken hose.

When the floating piston moves forwardly into position to close off the valve member 42 the spring pressed balls 55 engage in the groove or channel 53 of the piston in the manner stated to hold the latter.

Upon repairing the damaged flexible conduit or hose 15 the system is refilled with fluid through the filler hole 50. The action of the incoming fluid forces the floating piston away from the valve and into its normal operating position. This filling is accomplished in conjunction with the bleeder hole 51 so that in removing the plug from the bleeder hole the fluid in back of the floating piston can be displaced, allowing the piston to move back into normal operating position.

From the foregoing it will be apparent that there is provided by the present invention a simple, strong and durable safety device which, when installed adjacent to each of the fluid brake operating cylinders in the manner stated, will effectively prevent the failure of all of the brakes of the system in the event that one of the brake cylinders or flexible conduits connected therewith should fail, thus giving the motorist three brakes upon which he can rely for stopping the vehicle until the necessary repairs can be made.

We claim:

For use in a hydraulic brake system for automotive vehicles a safety device for a pulsating system comprising a cylinder closed at one end and open at the other, a removable head for the open end of said cylinder, a pressure fluid inlet in said head, a bleeder aperture in said head communicating with said inlet, a solid, one piece piston slidably received in said cylinder, a circumferential groove in said piston, an integral conical valve plug on the face of said piston opposite said head and disposed centrally thereof, an outlet passage in the closed end of said cylinder centrally thereof, a reduced threaded portion adjacent the inner end of said passage, a conical valve seat threadedly received in said threaded passage for adjustment relative to said valve plug, a filler aperture communicating with said passage and spring pressed detents radially disposed in the wall of said cylinder adjacent the closed end thereof, whereby upon movement of said piston to a position adjacent the closed end of said cylinder, said valve plug will engage said valve seat to close said passage and said detents will engage said groove to hold said valve plug in engagement with said valve seat.

References Cited in the file of this patent

UNITED STATES PATENTS

| 2,111,930 | Hinckley | Mar. 22, 1938 |
| 2,128,853 | Roen | Aug. 30, 1938 |

FOREIGN PATENTS

| 333,365 | Great Britain | Aug. 14, 1930 |